G. ADAMS.
RACK.
APPLICATION FILED FEB. 27, 1917.

1,237,010.

Patented Aug. 14, 1917.

WITNESSES

INVENTOR
G. Adams
BY
ATTORNEYS ic
UNITED STATES PATENT OFFICE.

GEORGE ADAMS, OF BROOKLYN, NEW YORK.

RACK.

1,237,010.  Specification of Letters Patent.  Patented Aug. 14, 1917.

Application filed February 27, 1917. Serial No. 151,224.

*To all whom it may concern:*

Be it known that I, GEORGE ADAMS, a citizen of the United States, and a resident of the city of New York, borough of Brooklyn, in the county of Kings and State of New York, have invented a new and Improved Rack, of which the following is a full, clear, and exact description.

My invention relates to a rack particularly suitable for circular objects. The object thereof is to provide a simple, inexpensive and strong rack formed of two elongated members, identically shaped, arranged to provide spaced seats for receiving circular objects.

In the accompanying drawings, forming part of the application, similar characters of reference indicate corresponding parts in all the views.

Figure 1:
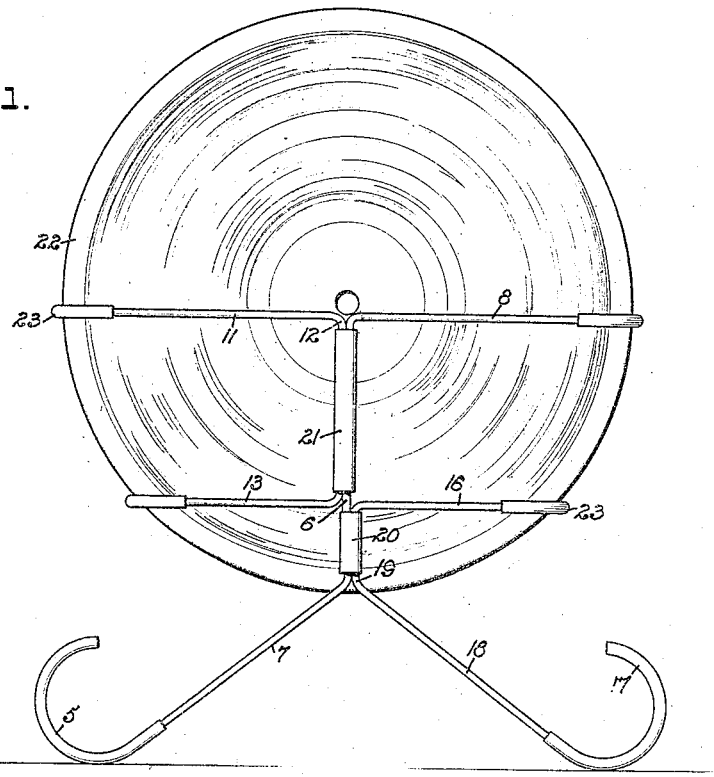
Figure 1 is an end elevation of my rack.
Figure 2:
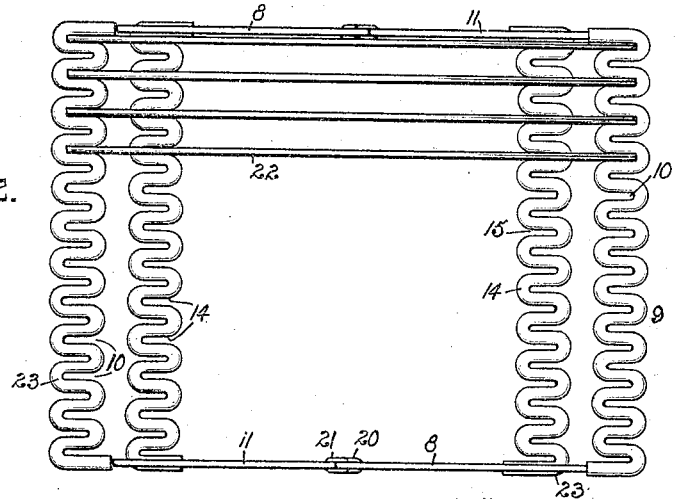
Fig. 2 is a plan view.
Figure 3:
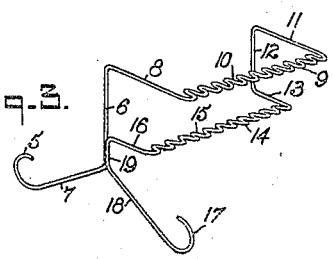
Fig. 3 is a perspective view of one of the elongated, shaped members.

Referring to the drawings, 4 is a wire, one end of which is turned to form a hook 5. It has a vertically directed portion 6 spaced from the hook 5 and forming an obtuse angle with a sloping portion 7 connecting the hook to the portion 6. A portion 8 of the wire is bent at right angles to the portion 6. The hook 5 and the portions 6, 7 and 8 all lie in a common plane. A portion 9 of the wire is then bent laterally from the portion 8 to form a plurality of interconnecting U's 10, the alternate U's opening on the same side.

A portion 11 of the wire extends from the sinuous portion 9 in the same direction and parallel to the portion 8. The portions 8, 9 and 11 lie in a common horizontal plane. A portion 12 of the wire is bent downwardly at right angles to the portion 11; and another portion 13 of the wire is bent at right angles to the portion 12 and parallel to the portion 11, said portions 11, 12 and 13 lying in a common vertical plane, the portion 13 being shorter than the portion 11, and the portion 12 being shorter than the portion 6. A portion 14 of the wire is bent laterally to the portion 13 in a manner similar to the portion 9 to present interconnecting U's 15, the alternate U's of which are open on the same side. The U's of the portions 9 and 14 open on the same side are in alinement. The length of the two sinuous portions 9 and 14 is the same.

The sinuous portion 14 terminates in a horizontal portion 16 identical to the portion 13 but in a vertical plane with the portion 8 of the wire and in a horizontal plane with the portions 13 and 14. The second end of the wire terminates also with a hook 17 which is connected by a sloping portion 18, identical to the portion 7, to a vertical wire portion 19 which extends from the portion 16. The portion 16 and the portions 19 and 6 are secured together by a member 20.

Two members shaped as described are brought together so that the ends of the wires forming the members are opposite. This will bring the vertical portion 6 of one member in proximity to the vertical portion 12 of the other member. These two portions are bound together by a suitable member 21, or by simply soldering them together if so desired. In consequence the resulting rack would have supporting means at each end forming part of one of the shaped wires. The U's of the sinuous portions which open inwardly, or face, will form seats for circular objects 22. The sinuous portions can be covered in any suitable manner with yielding material 23, as shown, to prevent injury to objects resting on the said portions of the wire members. The hooked portions of the members can also be covered in a similar manner.

It will be noted that in my rack the members forming the same are identical in shape and each formed of a single wire shaped to provide supporting means to one side of the shaped member, so that when the two members are bound to form a rack there are supporting means at each end.

I claim:

1. A rack formed of two identical wires, each shaped to present a pair of vertically spaced, horizontally disposed U series having supporting means at the same end, the upper of said U series overhanging the lower, and means binding the supporting means of one of said shaped wires to the other wire at the end where there is no supporting means.

2. A rack formed of two identical wires, each shaped to present a hook-shaped end joined to a vertical portion by a sloping portion, a horizontal portion extending from the vertical portion in a direction opposite from the hook-shaped end, a sinuous portion extending from the horizontal portion at right angles to the same and forming a series of interconnecting U's, a horizontal portion extending from the said sinuous portion parallel to the first-mentioned horizontal portion and of substantially the same length and extending in the same direction from said sinuous portion, a vertical portion depending vertically from the second horizontal portion, a third horizontal portion extending parallel to the second horizontal portion from said second vertical portion in the same direction as the second horizontal portion from the sinuous portion, and of a length less than the said second horizontal portion, a sinuous portion similar to the first extending parallel to the first, over said third horizontal portion, and at right angles to the same, a fourth horizontal portion extending from said second sinuous portion parallel to the first and third horizontal portions and underlying said first portion, a vertical portion extending from said fourth horizontal portion along the first vertical portion, a sloping portion extending from said second vertical portion in a direction opposite to the first-mentioned sloping portion, and a hook-shaped portion at the end of said wires similar to the first-mentioned hook-shaped end.

3. A rack formed of two identical wires, each shaped to present a hooklike end joined to independent vertical portions by a sloping portion, said vertical portions being in proximity to one another and in a common plane with the hooklike ends and the sloping portions, and a sinuous portion having a series of horizontally-disposed interconnected U's extending from each of the vertical portions and spaced vertically so that the upper U's overhang the lower U's, said sinuous portions lying in planes at right angles to the plane first mentioned.

4. A rack formed of two identical wires, each shaped to present a pair of vertically-spaced, horizontally-disposed interconnecting U's having supporting means at the same end, the alternate U's of the same series opening on the same side, and means binding the supporting means of one of the shaped wires to the other shaped wire at the end where the other wire has no supporting means.

GEORGE ADAMS.

Copies of this patent may be obtained for five cents each, by addressing the "Commissioner of Patents, Washington, D. C."